United States Patent [19]

Nykerk

[11] Patent Number: 5,357,560
[45] Date of Patent: Oct. 18, 1994

[54] ADAPTABLE ALARM INTERFACE UNIT FOR USE WITH ELECTRONIC AUTOMOBILE ALARM SYSTEMS AND THE LIKE

[75] Inventor: Michael Nykerk, Canoga Park, Calif.

[73] Assignee: Electronic Security Products of California, Inc., Canoga Park, Calif.

[21] Appl. No.: 227,586

[22] Filed: Apr. 14, 1994

Related U.S. Application Data

[63] Continuation of Ser. No. 914,969, Jul. 16, 1992, abandoned.

[51] Int. Cl.[5] .......................................... H04M 11/00
[52] U.S. Cl. ........................................ 379/59; 379/44; 340/426; 340/692
[58] Field of Search ................... 379/40, 43, 44, 58, 379/59, 60, 63, 67, 82, 89, 140, 130, 131, 42; 340/426, 438, 460, 692

[56] References Cited

U.S. PATENT DOCUMENTS

| | | | |
|---|---|---|---|
| 3,471,652 | 10/1969 | Moore et al. | 179/100.1 |
| 3,855,574 | 12/1974 | Welty | 340/148 |
| 4,218,763 | 8/1980 | Kelley et al. | 340/65 |
| 4,325,058 | 4/1982 | Wagner et al. | 340/562 |
| 4,337,462 | 6/1982 | Lemelson | 340/572 |
| 4,401,971 | 8/1983 | Saito et al. | 340/52 F |
| 4,465,904 | 8/1984 | Gottsegen et al. | 179/5 R |
| 4,581,605 | 4/1986 | Vogt | 340/525 |
| 4,642,612 | 2/1987 | Crump | 340/506 |
| 4,794,368 | 12/1988 | Grossheim et al. | 340/63 |
| 4,845,464 | 7/1989 | Drori et al. | 340/429 |
| 4,887,064 | 12/1989 | Drori et al. | 340/426 |
| 4,897,630 | 1/1990 | Nykerk | 340/426 |
| 4,901,054 | 2/1990 | Waterman | 340/426 |
| 4,905,271 | 2/1990 | Namekawa | 379/44 |
| 4,987,402 | 1/1991 | Nykerk | 379/40 |
| 5,003,576 | 3/1991 | Helferich | 379/59 |
| 5,081,667 | 1/1992 | Drori et al. | 379/44 |

FOREIGN PATENT DOCUMENTS

191541 9/1983 Japan ........................ 379/58

OTHER PUBLICATIONS

"Auto Security Even Kadafi Would Love", *Installation News*, vol. 3, No. 1, pp. 18–19 (Nov. 1985).

Advertisement for the "Ungo Box TL-1500 Remote Vehicle Security System", *Installation News*, vol. 3, No. 1, p. IN/28 (Nov. 1985).

(List continued on next page.)

*Primary Examiner*—Curtis Kuntz
*Assistant Examiner*—I. S. Rana
*Attorney, Agent, or Firm*—Fitch, Even, Tabin & Flannery

[57] ABSTRACT

An interface unit adapts an existing alarm system, e.g., an existing automobile alarm system, so that it selectively provides additional alarm features not previously available. Such features are made available, at least in part, through use of the components of the existing alarm system. Thus, there is no need to remove the existing alarm system, or (in one embodiment) to even cut or relocate any of the wires used with the existing alarm system. All that is required is to install the interface unit and couple it in an appropriate manner to the existing system. The features made available through the interface unit selectively include voice messages that are triggered: whenever the alarm system senses a violation event, to indicate the arming or disarming of the system, or to report to the owner the violation events that have occurred since the system was last armed. Further, a vocal report to the owner from the interface unit indicates that an incoming cellular call is ringing, or reports how many unanswered cellular calls occurred during a predetermined time period. Still further, the interface unit allows, in one embodiment, one or more of the sensors used with the existing alarm system to be selectively disabled or enabled.

9 Claims, 10 Drawing Sheets

Microfiche Appendix Included
(56 Microfiche, 1 Pages)

OTHER PUBLICATIONS

"Passive Disarming?", *Installation News*, vol. 3, No. 2, p. 12 (Dec. 1985).

"Auto Security", *Installation News*, vol. 3, No. 3, p. 4, (Jan. 1986).

"This Butler Did It", *Robotics World*, Mar. 1986, "Noted in Passing" Section.

Pusey, Roger, "Magician's Versatile Box Gives New Meaning to 'Butler Did It'", *Deseret News*, p. 6M, (Apr. 17, 1988).

Plumb, Barbara, "The 'Thinking Gadget'", *Vogue*, (Feb., 1986), in Currents Section.

"Butler in a Box", *Security Dealer*, p. 52 (Apr. 1986).

"Calafax Horn-a-Plenty", *Mechanix Illustrated*, p. 76 (Jun. 1983).

"Crimestopper Security Products, Inc.", *Mechanix Illustrated*, p. 74 (Jun. 1983).

Palenchar, Joseph, "Prewarning Sensors New Focus in Security", *Twice*, vol. 6:10, pp. 15–16 (Mar. 11–15, 1991).

McCune, Arthur, "Cars Speak Up", *The Ledger*, pp. 1C, 2C, (Apr. 19, 1991).

*Home Mechanix*, Nov. 1987, p. 33, top of Column 1.

Clockman, Walter, "Unconventional Burgler Alarm", *Funkschau*, Nov. 1982, pp. 50–52.

Advertisement for "DIGI-TALK", manufactured by Levitron International, Oceanside, Calif.

Advertising Brochure for Gaxaly Technologies, Inc.

ADAPTABLE ALARM INTERFACE UNIT FOR USE WITH ELECTRONIC AUTOMOBILE ALARM SYSTEMS AND THE LIKE

This is a continuation of copending application(s) Ser. No. 07/914,969 filed on Jul. 16, 1992 now abandoned.

BACKGROUND OF THE INVENTION

The present invention relates to electronic alarm systems. More particularly, the present invention relates to an adaptable interface unit for use with an existing alarm system, e.g., an existing electronic automobile alarm system, that adds a wide variety of programmable features to the alarm system that would not otherwise be available.

Alarm systems are known in the art. A typical alarm system is installed for the purpose of securing a defined area from unauthorized intrusion or trespass. The defined area that is secured by the alarm system will usually comprise a closed area, such as specified room(s) within a building, or an entire building or house. In the case of automobile alarm systems, the secured area typically comprises the interior of an automobile, or other motorized or non-motorized vehicle, and may also extend to unauthorized tampering with the exterior of the automobile.

All alarm systems have certain basic elements in common. Conventional electronic automobile alarm systems, for example, typically include at least the following basic components: (a) a plurality of sensors or detectors; (b) an alarming device or mechanism, e.g., an audible alarm siren or horn; (c) an arming circuit; and (d) a control unit.

The plurality of sensors or detectors are used to sense an entry event or other activity that could be viewed as an unauthorized tampering or presence (hereafter a "violation condition" or "violation event"). Each of the plurality of sensors is fashioned to be responsive to a particular type of violation condition, such as movement of the automobile, prolonged close proximity of a person to the automobile, excessive acoustic energy within the automobile (as occurs with glass breakage), or the opening of a door or portal into one of a plurality of compartments within the automobile. Further, each sensor generates a violation signal in response to the violation condition.

The plurality of sensors are coupled, usually with electrical wires (although RF or other communication links may also be used), to the control unit. Thus, any generated violation signal is coupled to the control unit, and in response thereto, the control unit activates the alarming output device. The alarming device usually comprises an audible alarm, siren, horn or bell, and when activated is intended to scare off the would-be intruder and to draw attention to the fact that an intrusion or other violation condition has been detected.

Some alarm systems, in response to a violation signal, transmit an alarm signal to a remote location, such as a police station or a neighboring facility. The alarm signal, when received at the remote location, indicates a violation condition has been detected. The control unit continues to activate the alarm device until the control unit is reset or until the control unit is disarmed. Typically, the control unit will reset automatically after a prescribed period of time from first sensing the violation condition.

A simple automobile alarm system may use the automobile's existing electrical system (used, for example, to turn on a light when a door is opened) as the plurality of sensors that are connected to a suitable control unit. A violation condition may thus be sensed if the door is opened when the control unit is armed and if too much time passes (typically 10 to 15 seconds) before the control unit is disarmed (turned off).

More sophisticated automobile alarm systems supplement the above-described basic alarm system with additional sensors (e.g., that sense the opening of the hood or trunk, the removal of an automobile cover, or the presence of "motion" within the automobile) and a correspondingly more complex control unit. Such sophisticated systems may also include backup battery protection and remote paging capabilities so that when a violation signal is generated, a paging device carried by the automobile operator will sound or otherwise indicate that the violation condition has occurred. Further, it is not uncommon for such systems to take more preventative steps than merely sounding an alarm. For example, automobile alarm systems are known in the art that, upon sensing a violation condition (such as the opening of the door, trunk or hood while the system is armed), will disable the ignition and/or fuel delivery system of the automobile's engine, thereby rendering it impossible to drive the automobile under its own power.

A feature common to all automobile alarm systems is the ability to selectively arm or disarm the system. The arming circuit of a simple alarm system generates an "ARM" signal after a prescribed time delay, such as 15 seconds, following the manual setting of an arming switch inside of the automobile. (Typically, such switch is "hidden" or otherwise made non-conspicuous so that only the automobile's owner knows of its location and function.) This type of simple alarm system arming is known in the art as passive arming. The prescribed time delay subsequent to the arming of the system allows the automobile owner sufficient time to exit the automobile prior to the system becoming armed. Similarly, upon reentering the automobile, as mentioned above, another time delay allows the owner sufficient time to manually disarm the system before a violation condition is sensed. The arming circuit of a basic alarm system will generate a "DISARM" signal following the manual setting of the arming switch inside the automobile.

Alternatively, the arming circuit of an alarm system may include an arming receiver and an arming transmitter. The arming transmitter provides an "ARM" transmission and a "DISARM" transmission when activated by the automobile operator. Typically, the "ARM" transmission and the "DISARM" transmission are substantially identical radio frequency (RF) pulses generated by the arming transmitter, however in a more advanced alarm system different RF pulses may be used for the "ARM" transmission and the "DISARM" transmission. The "ARM" transmission and the "DISARM" transmission are received by the arming receiver, coupled to or included within the control unit, when the arming transmitter is proximate to the arming receiver. In response to the "ARM" and "DISARM" transmissions, the arming receiver generates the "ARM" and "DISARM" signals respectively. Note that when substantially identical RF pulses are used for the "ARM" and "DISARM" transmissions, the arming receiver generates the "ARM" and "DISARM" signals after successive RF pulses, respectively, i.e., the arming receiver toggles between ARM and DISARM states. In a more advanced alarm system, using different RF pulses for the "ARM" and "DISARM" transmissions, the arming receiver generates the "ARM" signal or the "DISARM" signal in response to the particular "ARM" or "DISARM" RF pulse that is received.

The "ARM" and "DISARM" signals are used to arm and disarm the control unit respectively. Once armed, each of the plurality of sensors is enabled and sensitive to a violation condition. When a sensor detects the violation condition and the control unit is armed, the alarm device is activated. Additionally, an indicator, such as a light emitting diode (LED), is typically turned on when the system is armed. The LED indicates to the automobile operator that the system is armed, and also serves to let a would-be intruder know that the automobile is protected by an armed automobile alarm system. When the control unit is disarmed, the plurality of sensors are disabled, the alarm device cannot be activated, and the LED indicator is turned off.

A major concern with conventional automobile alarm systems relates to their cost and complexity of installation. To illustrate, a simple automobile alarm system (e.g., one that uses only the existing wiring of the automobile) can be inexpensively manufactured and simple to install (and therefore quite affordable to the owner). Unfortunately, the simple alarm system does not have many features desired by most automobile owners. Heretofore, when owner of an automobile wanted to upgrade his or her existing automobile alarm features, it was necessary to replace their existing automobile alarm system with a more advanced alarm system that provides the desired features. Problematically, such replacement can only be achieved by removing the existing alarm system, thereby incurring removal expense, and installing the new alarm system, thereby incurring installation expense. Disadvantageously, the expense of removal and replacement discourages many owners from having an automobile alarm system that includes all the features they may need or desire. Thus, what is needed is an inexpensive means of adapting an existing automobile alarm system to include additional features not available with the existing alarm system.

The present invention advantageously addresses the above and other needs.

SUMMARY OF THE INVENTION

The present invention provides an interface unit that adapts an existing alarm system to include new and enhanced features not typically available in the existing alarm system. The existing alarm system will typically include: (a) a plurality of sensors or detectors; (b) an alarming device or mechanism, e.g., an audible alarm siren or horn; (c) an arming circuit; and (d) a control unit. The interface unit of the present invention advantageously adapts such existing alarm system to include additional features. Such features may include, e.g., the use of voice messages: in response to a sensed violation condition, to indicate the arming or disarming of the system, or as part of a vocal report that reports all, or, e.g., the first or last, violation condition or conditions that have occurred since the system was armed. Further, a vocal report may indicate that an incoming cellular telephone call is ringing, or report how many unanswered incoming cellular telephone calls were received over a predetermined time period. Such features may also include the ability to selectively disable each of the plurality of sensors, e.g., in the event a sensor becomes defective; and/or the ability to flash the automobile's parking lights in response to the alarm violation signal, the ARM and DISARM signals, and/or the ringing of an incoming cellular telephone call. Advantageously, the present invention thus eliminates the need to replace the existing conventional automobile alarm system in order to add desirable features thereto. In this way, the interface unit of the present invention significantly reduces the cost involved in removing an existing alarm system and replacing it with a new alarm system that includes the needed or desired features.

The interface unit of the present invention is coupled to the signals passing into and out of the control unit of the existing alarm system. In a first configuration or embodiment, the violation signals are coupled in parallel fashion to both the control unit of the existing alarm system and to the interface unit. Similarly, the alarm device activating signal (generated by the control unit in response to a violation signal received from one or more sensors) is coupled to both the alarming device or mechanism and the interface unit. The interface unit is also coupled to the ARM/DISARM signal, e.g., by being wired in parallel to an "armed" indicator LED that is typically part of the control unit of the existing alarm system In a second configuration or embodiment, the violation signals from the existing sensors are coupled only to the interface unit. In response to a violation signal from a given sensor, the interface unit generates a trigger signal that is coupled to one of the decoupled sensor inputs of the existing control unit. The alarm device activating signal generated by the existing control unit is then used to further activate the interface unit. Thus, in this second configuration, the violation signals are coupled in serial fashion through the interface unit to the control unit. As with the above first embodiment, the interface unit is also coupled to the ARM/DISARM signal.

The interface unit of the present invention includes: (1) a processor, and (2) a voice generator, and (3) an audio amplifier/speaker. The processor controls the operation of the interface unit in accordance with a stored control program. Such operation may include control of: (a) a pulsing output for operating the automobile's parking or other lights, (b) a cellular telephone interface, and/or (c) a menu pad or menu switch.

The audio amplifier/speaker generates audible voice messages in response to the activation of the voice generator. The voice generator is activated, e.g., by the interface unit when the alarming device activating signal activates the interface unit, as described above.

The pulsing output of the interface unit, when used, pulses or flashes the automobile's parking or other lights in response to the occurrence of a violation signal, the ARM/DISARM signal, and/or other signals that may be generated by the processor in response to the control program.

The cellular telephone interface, when used, generates a ring signal in response to an unanswered incoming call on a cellular telephone, or the like. Such, ring signal activates the voice generator so as to generate a vocal message announcing the incoming call. The ring signal also activates the processor such that the processor counts the number of unanswered incoming calls received by the cellular telephone during a predetermined period of time.

The menu pad or menu switch provides a means whereby an operator may selectively adapt the alarm system to include or not include certain features and/or functions. (Note that the terms menu pad and menu switch are used interchangeably throughout the specification.) For example, the menu pad may be used, in the second embodiment described above, to selectively disable one or more of the plurality of sensors. Thus, if one or more of the plurality of sensors is defective or ineffective, such sensor(s) can be disabled without disabling the entire system. The menu pad may also be used, in accordance with another possible embodiment, to select a particular vocal message from a plurality of vocal messages that is to be sounded in response to the occurrence of an alarm violation signal. Numerous other uses for the menu pad may be accommodated in the control program.

It is thus a feature of the present invention to provide an easy and inexpensive technique for adapting an automobile or other alarm system to include additional features not originally included in the existing alarm system.

It is another feature of the invention to adapt the existing alarm system to include such additional features without requiring the removal or deinstallation of the existing alarm system.

It is a further feature of the invention, in one embodiment, to add new features to the existing alarm system without requiring any modification to the existing alarm system's wiring.

It is another feature of the present invention to provide an interface unit for use with an existing alarm system that adds electronically generated voice capabilities to the existing alarm system.

It is yet another additional feature of the invention, in one embodiment, to adaptively alter an existing alarm system so that each of a plurality of sensors used with the existing alarm system can be selectively enabled or disabled.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

As summarized above, the present invention is directed to an interface unit that is designed to be used with an existing alarm system. (However, as will be evident from the description that follows, the interface unit may also function as a stand-alone unit-without an existing alarm system-provided that one or more sensors are available that can be connected or coupled to the interface unit, and providing some means is made available to selectively ARM and DISARM the system.) Thus, it will first be helpful to briefly review the main components that are typically present in most electronic alarm systems.

Figure 1:
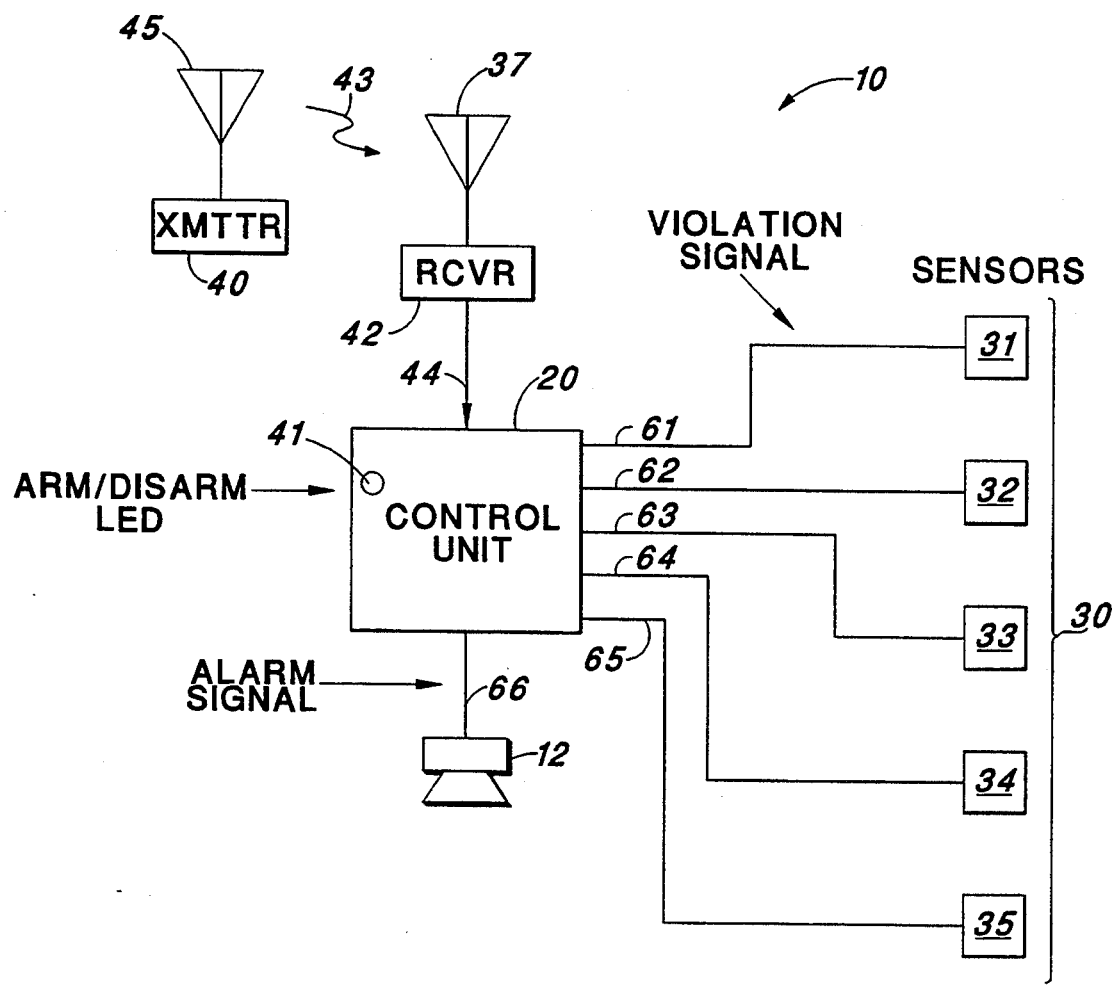
FIG. 1 is a block diagram of a prior art conventional automobile alarm system.

Referring then to FIG. 1, a block diagram of a typical prior art alarm system 10 is shown. In the description of FIG. 1, and in the other descriptions presented herein, it is assumed that the alarm system 10 is used to protect an automobile. However, it is to be understood that the invention is not so limited. The interface unit of the present invention may advantageously be used to upgrade or adapt any existing alarm system, whether used to protect an automobile, a boat, a motorcycle or any other mobile object, or (in some instances) a stationary object, e.g., a house, a room, a building, a yard, a lot, etc.

As seen in FIG. 1, the alarm system 10 includes a control unit 20 that is coupled to an alarm device 12; an arming receiver 42; and a plurality of sensors 31, 32, 33, 34 and 35 (sometimes referred to hereafter collectively as the sensors 30). Each of the sensors 31, 32, 33, 34 and 35 is adapted to sense a particular violation event, e.g., the opening of a door, the opening of the hood or trunk, motion of the automobile, glass breakage, proximity of a large body mass that is moving, etc. Thus, when a particular violation event is sensed by the appropriate sensor, it generates a violation signal that indicates such sensing. (Note, that although five sensors are illustrated in FIG. 1, it is to be emphasized that this is only exemplary, as any number of sensors, from one to one hundred or more, could be used.)

In operation, the arming receiver receives an "ARM" transmission or a "DISARM" transmission via an RF communication link from an arming transmitter 40 located sufficiently close to the arming receiver 42 to communicate via the RF communication link, as is known in the art. The RF communication link comprises a transmission antenna 45 that sends a radio transmission, represented schematically in FIG. 1 as the wavy arrow 43, to a receiving antenna 37. When the arming receiver 42 receives the "ARM" transmission it generates an "ARM" signal that is coupled to the control unit 20. Similarly, when the arming receiver receives the "DISARM" transmission it generates a "DISARM" signal that is coupled to the control unit 20. A status indicator 41, typically realized using a light emitting diode (LED), is turned ON or blinks when the ARM signal is received, and is turned OFF when the DISARM signal is received.

In response to the "ARM" signal, the control unit 20 enables the plurality of sensors 30. That is, receipt of the "ARM" signal renders such sensors functional, either by turning them ON (e.g., by applying an operating voltage thereto) and/or by gating the output signals generated by the sensors to the appropriate circuitry within the control unit 20. Similarly, in response to the "DISARM" signal, the control unit 20 disables the plurality of sensors 30. That is, receipt of the "DISARM" signal renders such sensors ineffective, either by turning them OFF (e.g., removing an operating voltage therefrom) and/or by not coupling their respective output signals to the control unit 20.

When the control unit 20 is ARMed, a violation condition detected by one or more of the sensors 31, 32, 33, 34 or 35 is coupled to the control unit 20 by a respective sensor input line 61, 62, 63, 64 or 65. Thus, for example, should the sensor 60 sense a violation event, the output signal from the sensor 32 (which may be referred to as the "violation signal" generated by sensor 32) is coupled via the sensor input line 62 to the control unit 20. In response to the coupled violation signal, the control unit 20 generates an alarm signal. The alarm signal is coupled to the alarm device 12 via an alarm output line 66. The alarm device 12 provides an audible and/or visual warning of the receipt of the alarm signal. Typically, the alarm device 12 may comprise a siren, horn or bell. Alternatively, the alarm device 12 may comprise a signal generator, amplifier, and loud speaker, that emulates a siren, horn or bell.

As described above, it is thus seen that the prior art alarm system 10, when ARMed through the RF link 43 or equivalent, issues an alarm signal whenever one of its sensors senses a violation event. The alarm signal, in turn, activates the alarm device 12, e.g., by sounding an audible alarm and/or generating a visible display.

Figure 2:
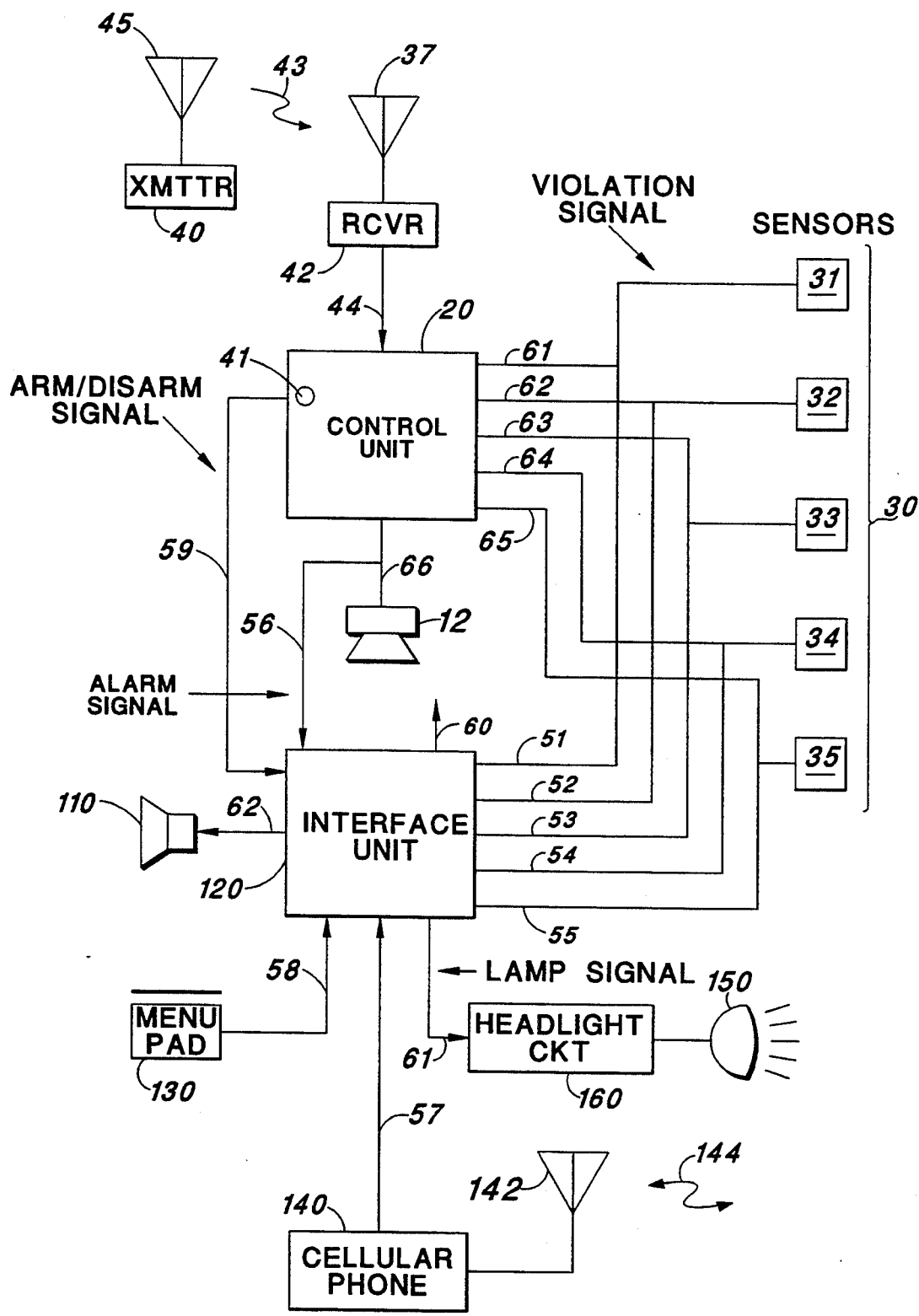
FIG. 2 is a block diagram showing an interface unit of the present invention connected in parallel with the existing conventional alarm system of FIG. 1, which parallel connection does not require any changes to the wiring of the conventional alarm system.

Referring next to FIG. 2, there is shown a block diagram of an interface unit 120 made in accordance with the present invention that is connected in parallel with the alarm system of FIG. 1. Advantageously, such parallel connection or configuration shown in FIG. 2 does not require any changes to the wiring of the conventional or existing alarm system 10. Thus, each of the sensors 31, 32, 33, 34 and 35 remains connected to the control unit 20 over signal lines 61, 62, 63, 64 and 65, respectively. Similarly, the alarm device 12 remains connected to the control unit 20 over alarm output line 66, and the ARM/DISARM receiver 42 remains in radio link contact with the remote ARM/DISARM transmitter 40. However, as seen in FIG. 2, the sensors 31, 32, 33, 34 and 35 are also connected to the interface unit 120 over signal lines 51, 52, 53, 54 and 55, respectively. Further, the alarm signal, which is directed to the alarm device 12 over alarm output line 66, is also directed to the interface unit over signal line 56. Thus, all of the signals and components of the existing alarm system 10 shown in FIG. 1 remain the same for the parallel configuration shown in FIG. 2.

In addition, as shown in FIG. 2, an ARM/DISARM signal is connected from the control unit 20 to the interface unit 120. Typically, such signal, if not otherwise readily available as an output of the control unit 120, may be readily derived from the LED ARM/DISARM indicator 41 of the control unit 120.

Coupled to the interface unit 120, in addition to the components of the existing alarm system 10 as described above, are an audio speaker 110 and a headlight, or parklight, control circuit 160. The audio speaker 110 is connected to the interface unit 120 via an audio cable 62, or equivalent. The headlight, or parklight, control circuit 160 is connected to the interface unit 120 via signal line 61, and is further coupled to one or more lights 150, e.g., the headlights or parklights, of the automobile or other object being protected. In addition, the interface unit 120 is coupled to a cellular phone 140 over signal line 57, which cellular phone is in selective telecommunicative contact with the local telephone network (and through such local network, remote telephone networks) via antenna 142. Through such telecommunicative contact, the cellular telephone 140 receives incoming telephone calls and sends outgoing telephone calls, in conventional manner. Such telecommunicative contact is represented symbolically in FIG. 2 as the wavy arrow 144.

Also coupled to the interface unit 120 via a suitable data bus 58 is a menu pad 130. The menu pad 130 functions as an input device through which an operator can make various selections to control the operation of the interface unit. The menu pad 130 is typically made from a suitable push button switch and is adapted to detect any pressing of the switch. Alternatively, the menu pad 130 may comprise a keyboard, having a plurality of depressible keys thereon, or equivalent. Finally, the menu pad 130 may also be implemented with a remote transmitter/receiver similar to the ARM/DISARM transmitter 40 and the ARM/DISARM receiver 42. In the event that the remote transmitter/receiver is used as the menu pad 130, the menu pad 130, advantageously, may be operated at a location remote from the automobile. Furthermore, the ARM/DISARM transmitter 40 may be adapted to generate a "MENU" transmission, in addition to the "ARM" and "DISARM" transmissions mentioned above, and the ARM/DISARM receiver 42 may be similarly adapted to generate a "MENU" signal in response to the "MENU" transmission. In this way, a single ARM/DISARM transmitter/receiver pair may be used both to arm or disarm the interface and as the menu pad 130.

The interface unit 120 and its operation is described more fully below in conjunction with FIGS. 4–6. Basically, the interface unit 120 includes a processor and speech generation circuits. The processor monitors the various sensors 30 to detect the occurrence of any violation signals, the cellular telephone 140 to detect any incoming telephone calls, and the menu pad 130 to detect any input commands. If any violation signals are received, or if any incoming cellular telephone calls are sensed, or if any specified commands are entered through the menu pad 130, then the processor responds in accordance with a preprogrammed control program. The response of the interface unit 120 to the detection of such events includes the generation of specific speech or vocal messages that are tailored to fit the particular event that has been sensed. For example, upon sensing a violation event, e.g., the unauthorized opening of a door, the interface unit may generate the message: "I'VE BEEN TAMPERED WITH!" Such message is intended to draw attention to the object being protected by the alarm system and to frighten away the intruder. Other predetermined or preprogrammed messages may similarly be generated. Thus, if one of the sensors is a proximity sensor, and if such sensor senses movement of a large body mass near the protected object, the interface unit may generate the message: "PLEASE BACK AWAY OR AN ALARM WILL SOUND!"

In like manner, if an incoming telephone call is sensed, the speech generation circuits of the interface unit may announce: "YOU HAVE AN INCOMING CALL!" Further, the processing circuit of the interface unit 120 may be selectively programmed to count the number of incoming calls that are received while the alarm system is armed. Thus, when the owner returns and disarms the system, the owner can request a vocal report. Such vocal report may include the number of incoming telephone calls that occurred during the monitoring period. In this manner, the owner may be appraised of whether he or she needs to check with, e.g., an answering service or Message Manager SM service, services commonly available through most cellular telephone networks that record messages of incoming calls if the incoming call is not answered within a specified number of rings. Further, the vocal report may also provide, using the speech generation circuits of the interface unit, a report of the number and type of violation events that were sensed during the monitoring period, as well as the time of occurrence of each sensed violation event.

Further, the interface unit may respond to the receipt of an ARM or DISARM signal by generating the speech message; "Armed" or "Disarmed", thereby positively informing the operator what the status of the alarm system is. In addition, such ARMED or DISARMED status may further be manifest by flickering or flashing the headlights or parklights 150, as controlled by the headlight circuit 160. Such flashing of the headlights or parklights may also be selected as a response to a sensed violation event, thereby drawing additional attention to the object (e.g., vehicle) being protected.

The headlight circuit 160 is realized using a conventional relay, or equivalent, triggered by a lamp signal generated by the interface unit 120. The lamp signal is coupled to the headlight circuit 160 over signal line 61. In the preferred embodiment, it is a low amplitude signal of the type commonly generated by electronic logic circuits. The headlight circuit 160, amplifies the lamp signal as required, and uses the amplified signal to drive a relay coil, which relay coil selectively connects a power source, such as the automobile's battery, directly to the lamp, e.g., headlight(s) or parklight(s), that are to be controlled. In this manner, by selectively controlling the lamp signal to switch between two states in a prescribed pattern, the selected headlight(s) or parklight(s) (or other lights) can be made to flicker or flash in accordance with such prescribed pattern.

Advantageously, the menu pad 130 provides a mechanism by which the operator can adaptively alter the program of the interface unit in order to provide a desired response. For example in one embodiment, the operator may select, through the menu pad, the particular speech alarm message that is generated by the interface unit in response to each type of possible violation event. Further, through use of the menu pad, certain features of the interface unit, such as whether to count incoming telephone calls, or whether to flash the headlights, and/or parklights upon sensing an ARM or DISARM signal, or a violation event, may be selectively enabled or disabled by the operator.

Thus, it is seen that the interface unit 120 enhances the existing alarm system 10 by adding features to it that were not previously available. Such features include the addition of a voice or vocal response or report. Because the interface unit adds a vocal response and report capability to the alarm system, such unit is referred to by its manufacturer as the VOCALARM ® INTERFACE. A complete description of an alarm system that includes vocal response and reporting features may be found in U.S. Pat. No. 4,794,368. A further description of such an alarm system that includes a proximity sensor to sense and warn away those approaching a protected object may be found in U.S. Pat. No. 4,987,402. The '368 and '402 patents are both incorporated herein by reference.

It is noted that the '368 patent describes a self-contained alarm system that includes vocal or speech reporting capabilities. In contrast, the interface unit 120 described herein relates to an add-on module, as it were, that can be added to an existing non-vocal alarm system, to add vocal or speech capabilities thereto, and to add other features thereto (such as monitoring and reporting on the occurrence of incoming cellular telephone calls). Advantageously, such add-on module may be added to the existing alarm system using a parallel configuration shown above in FIG. 2; or using a series configuration, as shown below in FIG. 3.

Figure 3:
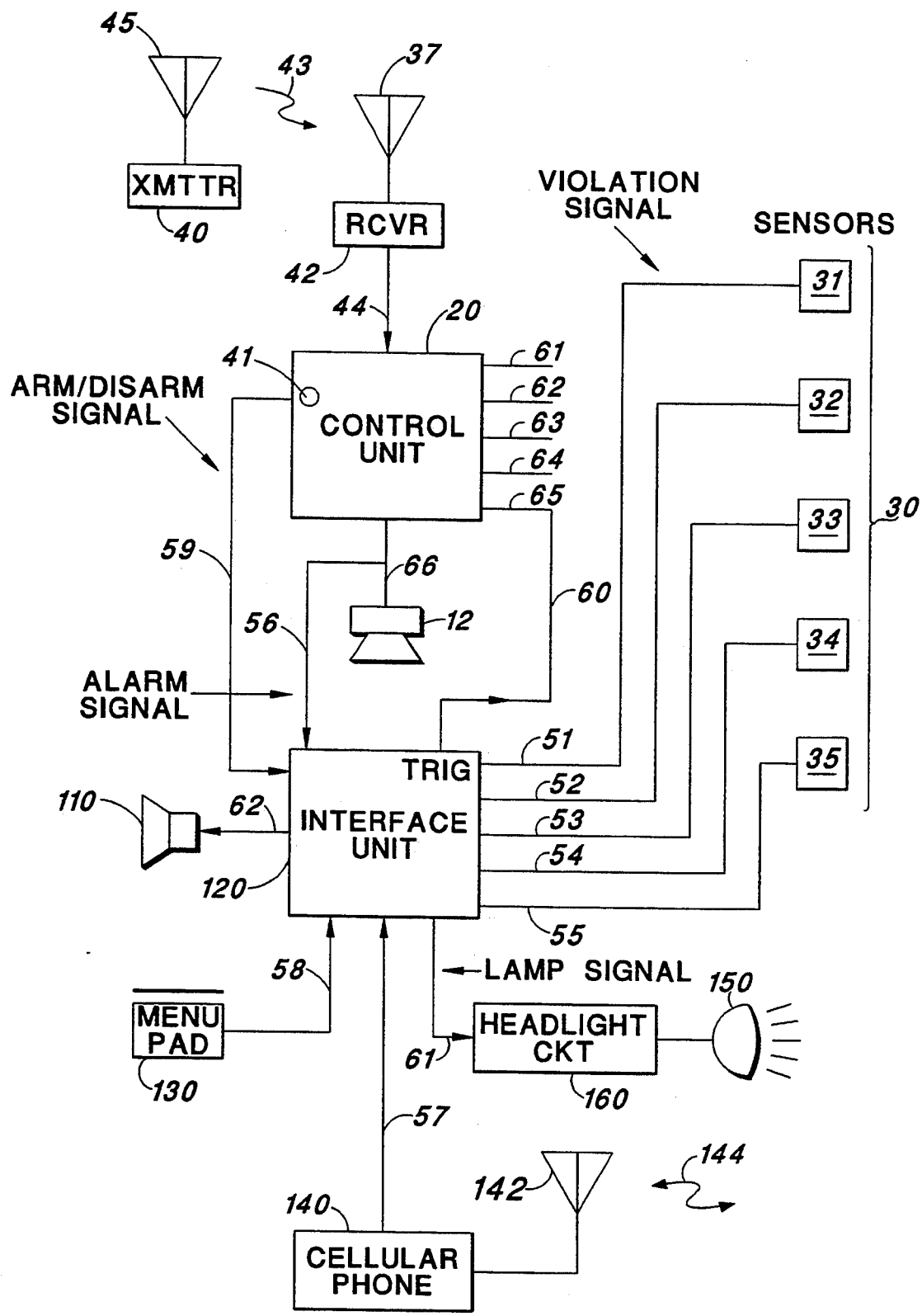
FIG. 3 is a block diagram showing an interface unit of the present invention connected in series with the existing alarm system of FIG. 1, which series connection allows each of a plurality of sensors of the existing conventional alarm system to be selectively enabled or disabled.

Referring next to FIG. 3, a block diagram showing the interface unit 120 of the present invention connected in series with the existing alarm system of FIG. 1 is shown. As is evident from FIG. 3, such series connection requires some alteration to the wiring of the existing alarm system. For example, the sensor lines 61, 62, 63, 64 and 65 that respectively connect the sensors 31, 32, 33, 34 and 35 to the control unit 20 of the existing alarm system 10 must all be cut, or disconnected. Each of the sensors 31, 32, 33, 34 and 35 are connected only to the interface unit 120 via the sensor input lines 51, 52, 53, 54 and 55 of the interface unit. A trigger output signal from the interface unit 120 is connected to one of the sensor input lines of the control unit 20, e.g., the sensor input line 65. Further, the ARM/DISARM signal from the control unit 20 is connected to the interface unit 120 over signal line 59. Also, the alarm signal (sent over alarm output line 66 from the control unit 120 to the siren 12, or other audible alarm device) is also directed to the interface unit 120 over signal line 56.

The audio speaker 110, menu pad 130, cellular phone 140, and headlight circuit 160 are connected to the interface unit 120 for the series configuration of FIG. 3 in the same manner as is described above in connection with FIG. 2.

In operation, the series configuration shown in FIG. 3 functions the same as the parallel configuration described above in conjunction with FIG. 2 relative to receiving the ARM/DISARM signal, and with respect to the operation of the menu pad 130 and cellular phone 140. Sensor input signals are received over the sensor input lines 51, 52, 53, 54 and 55. In response to a violation signal on one of these signal lines, the interface unit 120 generates a trigger signal. Such trigger signal is then directed to the control unit 20 of the existing alarm system 10 over signal line 60. Upon receipt of such trigger signal on one of the sensor input signal lines, the control unit 20 will thus respond as though a violation event had occurred. Accordingly, the control unit issues the appropriate alarm signal on signal line 66, causing the siren (or other alarm device) to be activated. Such alarm signal is also coupled back to the interface unit 120 over signal line 56, whereupon the interface unit 120 responds to the alarm signal in an appropriate manner, e.g., by sounding an appropriate speech message over the speaker 110.

For some series configurations, it may also be desirable to disable the alarm device 12 so that only the speaker 110 is used to sound the audible alarm. Moreover, should the alarm device 12 be disconnected from the control unit 20, it may then be driven by the trigger signal available on signal line 60.

One of the advantages of the series configuration shown in FIG. 3 is additional control and flexibility over use of the alarm system, and in particular over use of the plurality of sensors 30. That is, an operator of the series configuration system may programmably select, using the menu pad 130, which of the sensors 31, 32, 33, 34 or 35 are to be activated and which are not. Thus, should one sensor malfunction, for example, the operator need only deselect such sensor during a programing operation, thereby effectively instructing the interface unit 120 to ignore any signals that appear on the signal line from such deselected sensor. Further, should the object being protected be temporarily located in an environment where one or more of the sensors 30 may not be effective at protecting the object, e.g., a proximity sensor used With an automobile parked in a busy parking lot where multitudes of people would continually be in close proximity to the automobile, then such one or more sensors could be temporarily disabled.

As is also apparent from the configuration shown in FIG. 3, the interface unit 120 may effectively function as a stand-alone alarm unit so long as some suitable ARM/DISARM signal is generated to place it in an ARMED or DISARMED state. In such instance, for example, an operator could simply hide a toggle switch, coupled to the signal line 59, in a location known only to the operator, thereby facilitating the manual ARMING and DISARMING of the interface unit. Alternatively, the operator could secure an appropriate receiver 42, usable with a portable transmitter 40, which receiver 42 could be coupled directly to the interface unit 120 over signal line 59. (That is, for the configuration shown in FIG. 3, the output signal of the receiver 42, shown as signal line 44, could be connected directly to the ARM/DISARM input of the interface unit, shown as signal line 59.)

Figure 4:
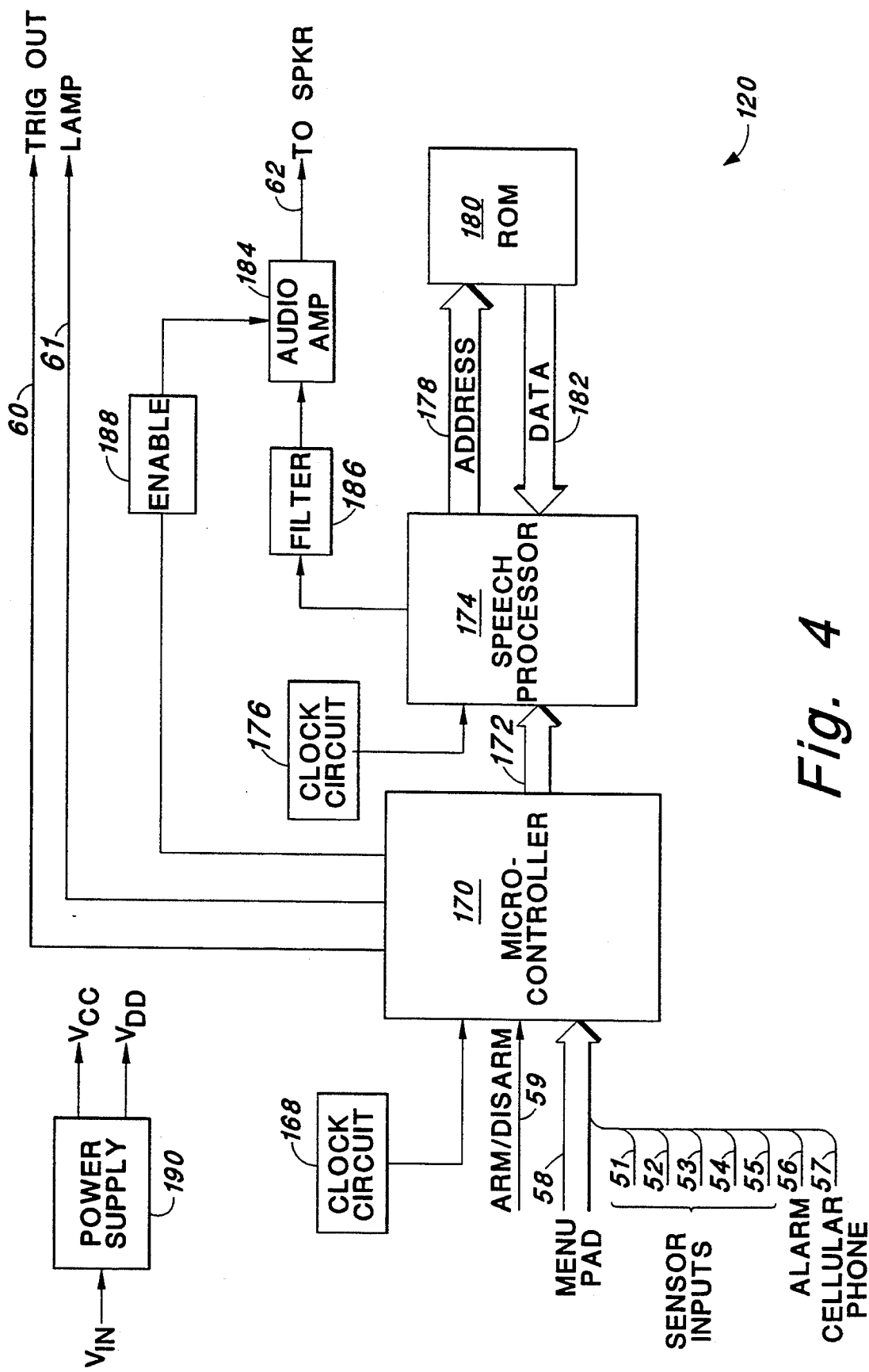
FIG. 4 is a block diagram of the interface unit of the present invention.

Turning next to FIG. 4, a block diagram of the hardware components of the interface unit 120 of the present invention is shown. As seen in FIG. 4, the interface unit 120 includes a microcontroller 170; a speech processor 174, a read only memory (ROM) 180; an audio amplifier 184; a filter 186; an enable switch 188; and a power supply 190. A first clock circuit 168 provides the requisite clock signal(s) for the microcontroller 170. A second clock circuit 176 provides the requisite clock signal(s) for the speech processor 174.

The microcontroller 170, as is known in the art, includes a microprocessor and memory for storing a control program that defines the operation of the control program. Such control program is discussed below in conjunction with the flow chart of FIG. 6. Further, a source code listing of a preferred control program is shown in the microfiche appendix, submitted herewith. A preferred microcontroller that may be used with the interface unit of the invention is a 65512 microcontroller available commercially from OKI Semiconductor of Sunnyvale, Calif.

The microcontroller 170 receives data input signals as shown above in FIGS. 2 and 3. Such data input signals include the sensor violation signals (on signal lines 51, 52, 53, 54 and 55), the ARM/DISARM signal (on signal line 59), an alarm device activation signal (on signal line 56), and a cellular phone signal (on signal line 57).

The microcontroller 170 also generates data output signals. Such signals include a trigger output signal (on signal line 60), and a lamp signal (on signal line 61), which signals are used as described above in FIGS. 2 and 3.

The microcontroller 170 is coupled to the speech processor 174 via a suitable data bus 172. Thus, in operation, when the microcontroller 170 senses that a speech message is needed, appropriate control signals are sent to the speech processor 174 over the data bus 172 that instruct the speech processor to generate the requested speech message. The speech processor responds by using such control signals to determine an address within the ROM 180 where other control data signals are stored that will allow the speech processor to generate the requested speech message. The determined address is sent to the ROM over an address bus 178; and the speech data stored at that address is then passed back into the speech processor 174 over a data bus 182. With the addressed speech data thus made available, the speech processor 174 assembles the speech data in an appropriate manner so as to cause a speech signal to be generated. The speech signal is coupled to the audio amplifier 184 via the filter 186. The enable switch 188, coupled to the audio amplifier 184, selectively enables or disables the audio amplifier 184 from sending the amplified speech signal to the speaker 110. In this manner, then, the speech processor is able to generate a wide variety of speech messages, limited only by the amount of speech data signals stored in the ROM 180.

In operation, the stored speech data signals comprise the digital equivalent of a single word or syllable. The speech processor, then retrieves the words and syllables, reconstructs them to provide the desired speech message comprising a word, phrase or sentence, and then converts the signal to an analog signal suitable for amplification by the audio amplifier 184.

In a preferred embodiment, the speech processor 174 is realized using a 6295 speech processing chip commercially available from OKI Semiconductor of Sunnyvale, Calif.; and the ROM 180 is realized using a 27C010 EPROM (erasable programmable read only memory) available commercially from, e.g., Texas Instruments. The audio amplifier 184 may be realized using any suitable audio amplifier. In the preferred embodiment, a TDA1519A power amplifier, commercially available from Signetics of Sunnyvale, Calif. is used. The filter 186 may be realized using an LM324 quad amplifier, commercially available from National Semiconductor, with all four amplifiers being connected in series as unity gain filter amplifiers (See, e.g., U4 in FIG. 5C).

Note that the microcontroller 170 also generates a speech enable signal that is directed to the output enable switch 188. Thus, a speech message may only be heard when the enable switch 188 is turned ON by the microcontroller 170. This action prevents any noise or cracking sounds, which might be amplified by or otherwise present at the output of the amplifier 184 from being heard through the speaker 110 when the enable switch is turned OFF.

Further included within the interface unit 120 is a power supply 190. The power supply converts whatever input voltage, $V_{IN}$, may be available to a suitable, filtered operating voltage for use by the circuits of the interface unit. Typically, two operating voltages are needed, labeled in FIG. 4 as $V_{cc}$ and $V_{DD}$. For example, if the object being protected is an automobile, having a conventional twelve voltage battery as the power source, the input voltage $V_{IN}$ is thus 12 volts, and the output voltages may be $V_{CC}=12$ volts (filtered) and $V_{DD}=5$ volts.

In the preferred embodiment, the power supply 190 includes an input filter circuit that filters the raw 12 volt input to provide the 12 volt (filtered) output; and a voltage regulator chip. The voltage regulator chip may be a UA70L05CP chip, available commercially from, e.g., National Semiconductor, that uses the filtered 12 volts as an input to provide the 5 volt output.

Figure 5A:
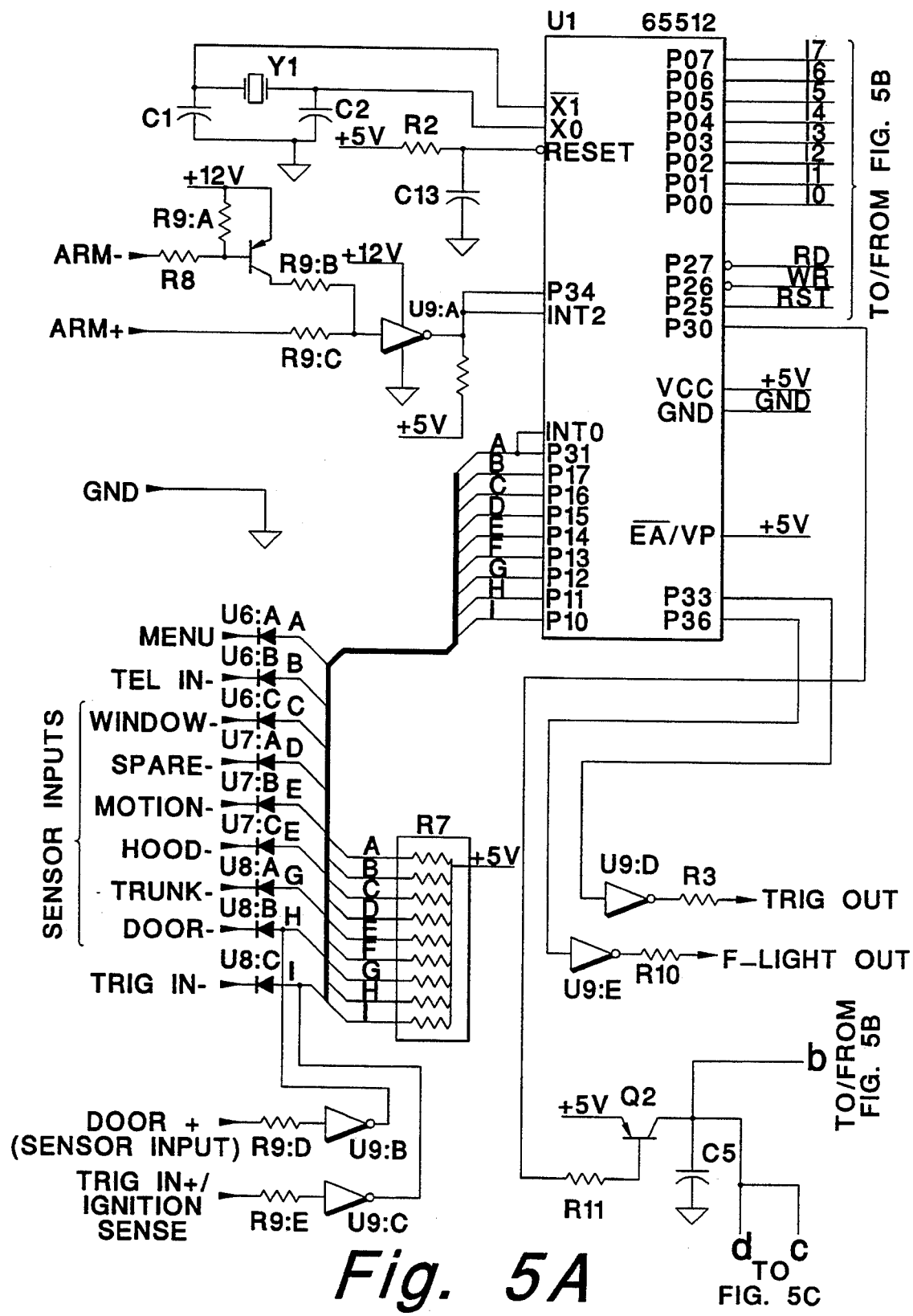
FIGS. 5A, 5B and 5C show in combination a detailed schematic diagram of the interface unit of FIG. 4.
Figure 5B:
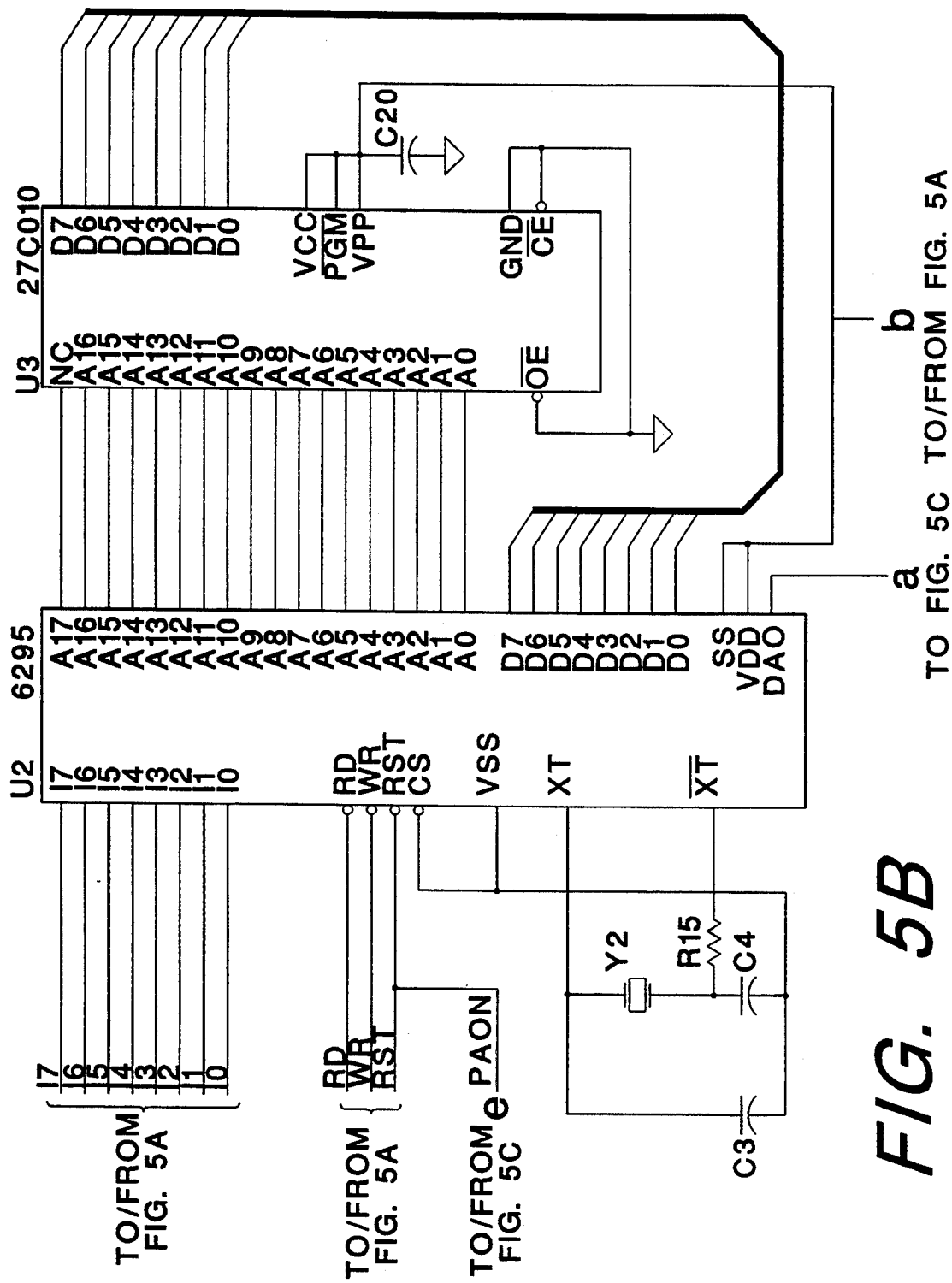
Figure 5C:
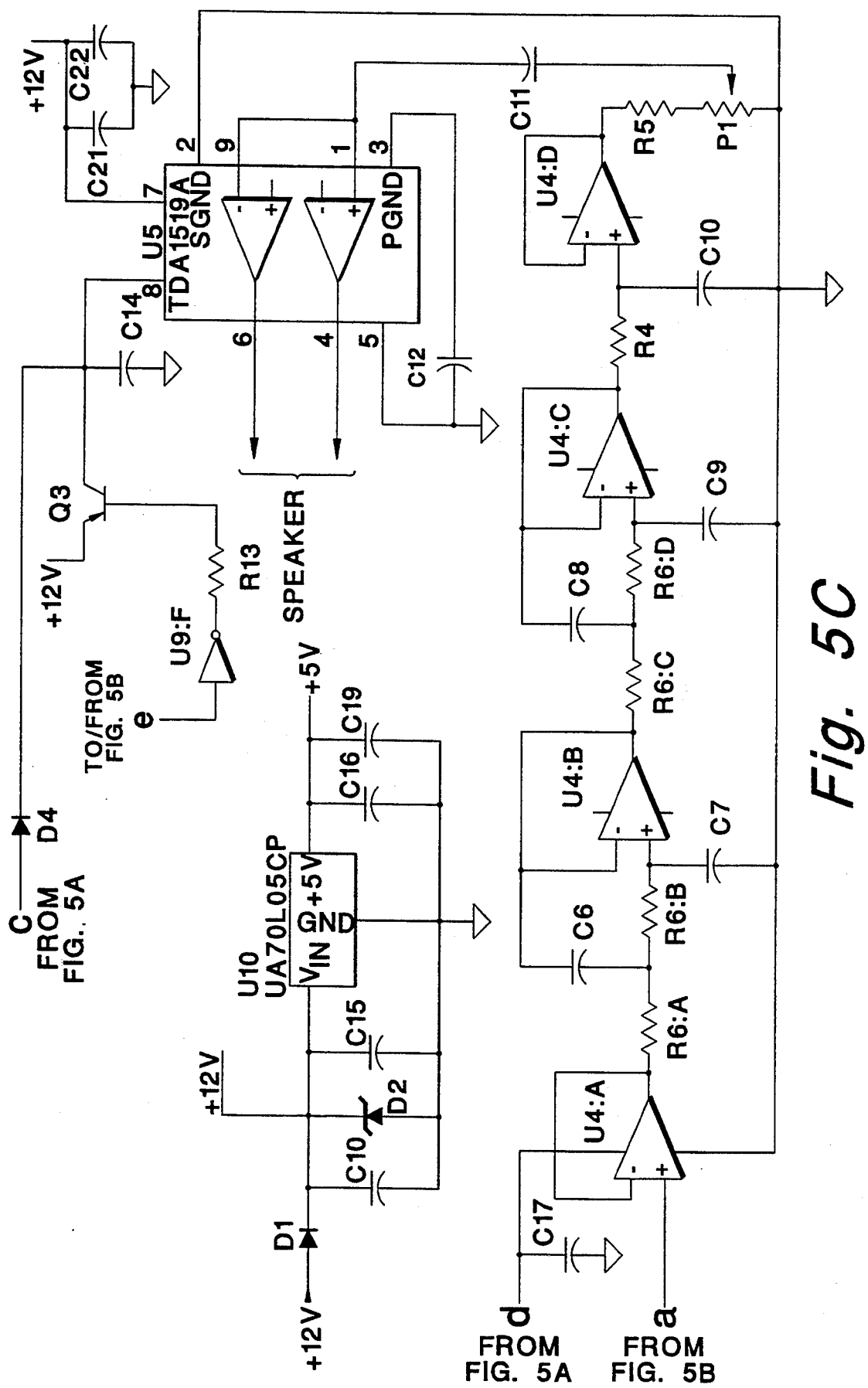

FIGS. 5A, 5B and 5C show in combination a detailed schematic diagram of the interface unit of FIG. 4. Such diagram provides more detail relative to the interconnection between the various components of the interface unit 120 than does FIG. 4, but otherwise closely parallels the block diagram of FIG 4. Hence, no further explanation of the operation of the interface unit, relative to the hardware diagrams of FIGS. 5 and 5A-5C, is believed to be necessary.

Figure 6A:
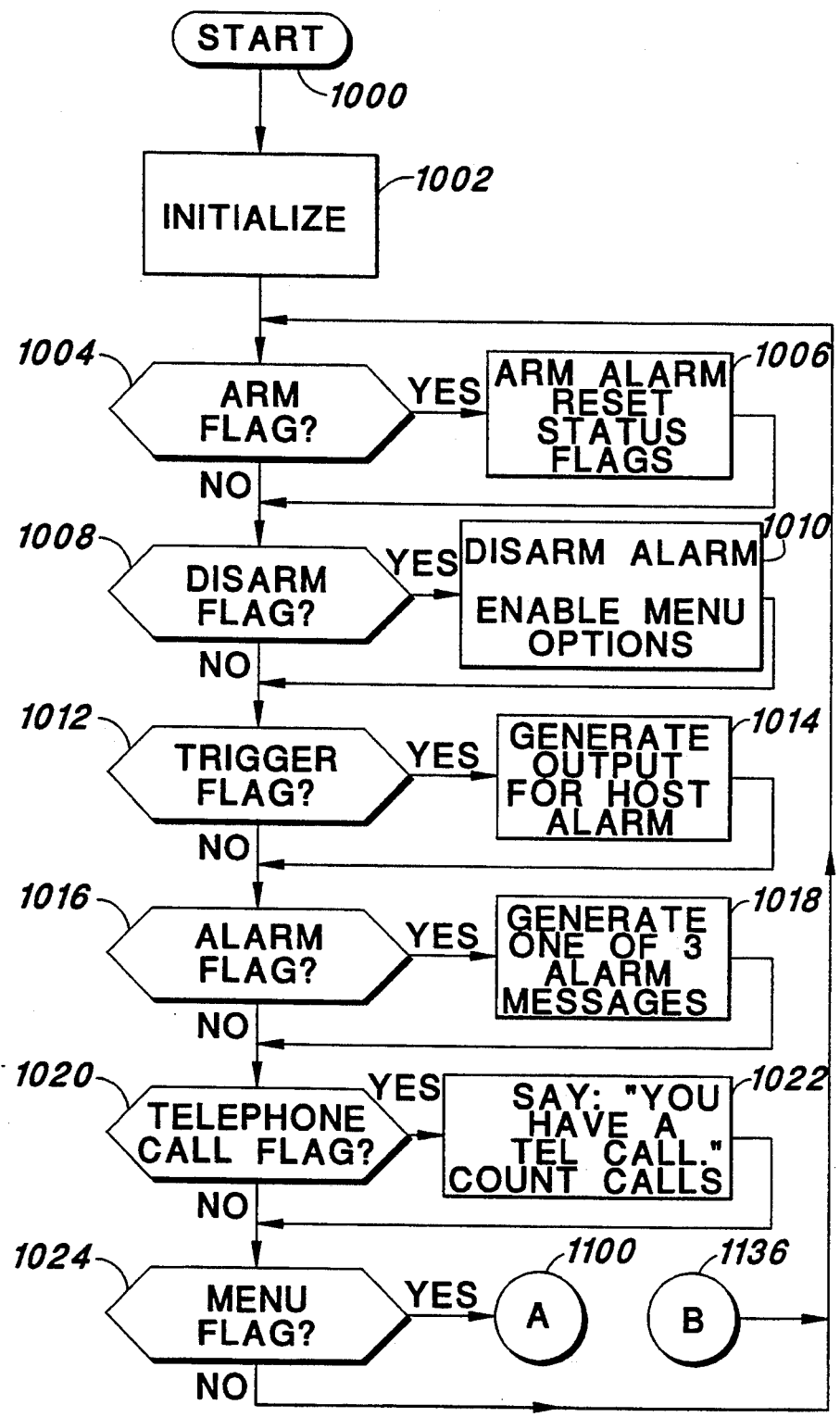
FIGS. 6A, 6B and 6C show a flow diagram showing the main steps traversed by the processor in the interface unit of FIG. 4.
Figure 6B:
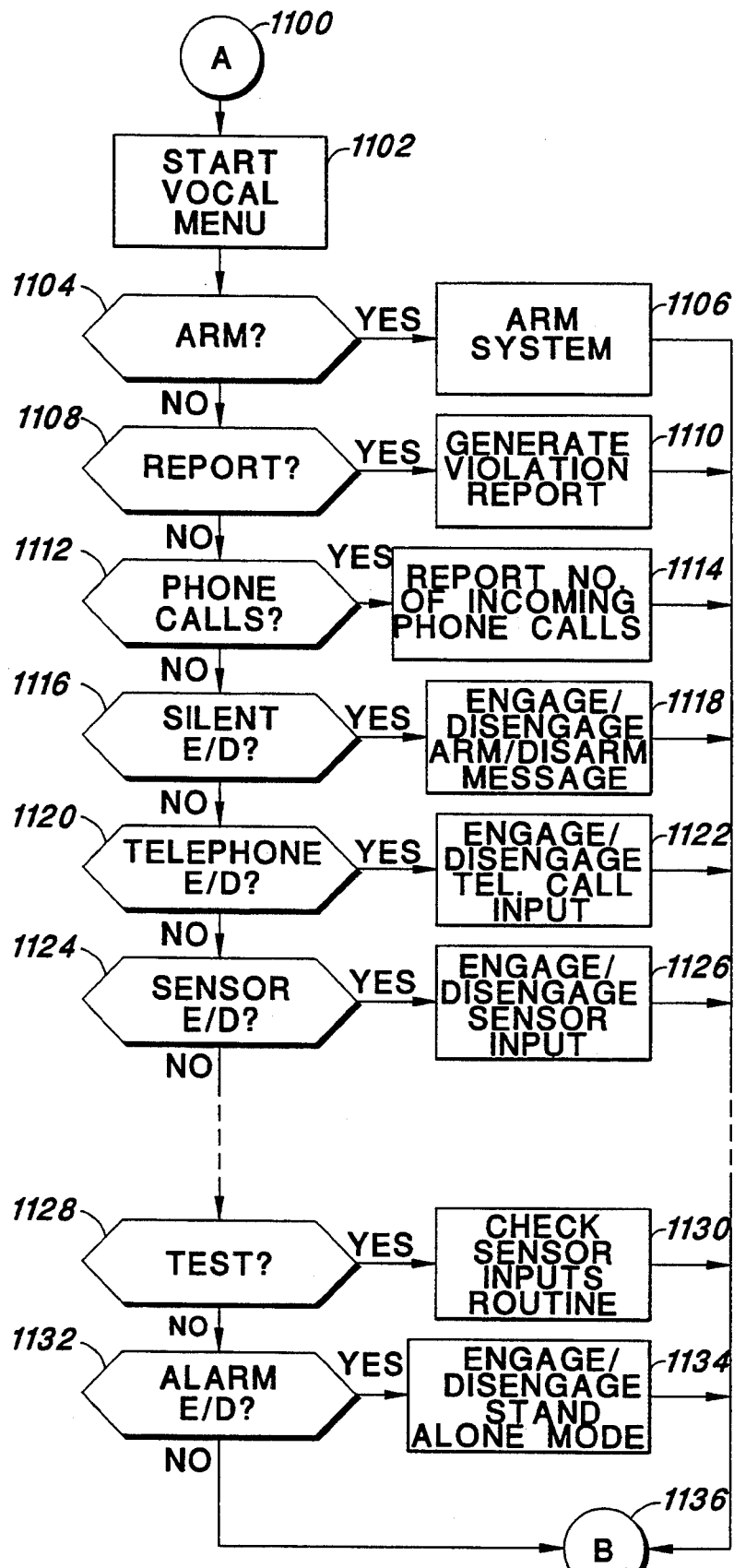
Figure 6C:
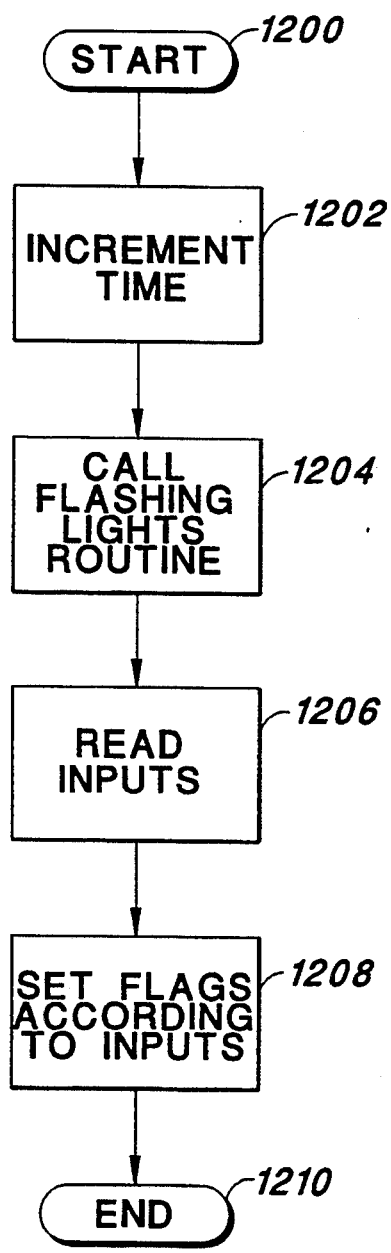

FIGS. 6A, 6B and 6C are a flow diagram showing the main steps traversed by the processor in the interface unit of FIG. 4 as controlled by a suitable control program. A preferred control program is provided in the microfiche appendix, submitted herewith and incorporated by reference.

Referring to FIG. 6A, a flow diagram is shown showing the main steps traversed by the processor while executing a main control program. When power is applied to the interface unit, the main control program begins to execute (Block 1000) and program parameters are initialized (Block 1002). The main control program then begins to monitor a plurality of status flags. The status flags are set or reset by an interrupt program shown in the flow diagram of FIG. 6C. If the arm flag is set (Block 1004) the interface unit is armed (Block 1006) as described hereinabove. Next, or if the arm flag is reset, i.e., not set, the disarm flag is tested (Block 1008). If the disarm flag is set, the interface unit is disarmed (Block 1010) and the menu function, described below, is enabled. Next, or if the disarm flag is reset, the trigger flag is tested (Block 1012). If the trigger flag is set, the trigger output signal (described above) is generated (Block 1014). Next, or if the trigger flag is reset, the alarm flag is tested (Block 1016). If the alarm flag is set, one of three voice alarm messages, e.g., "I've been tampered with," "Vehicle Security Violation" or "Burglar, Burglar, Burglar," is sounded through the audio speaker. These three voice alarm messages are sounded in sequential rotation during each subsequent execution of block 1018. Next, or if the alarm flag is reset, the telephone call flag is tested (Block 1020). If the telephone call flag is set, the message "You have a telephone call." is sounded through the audio speaker and a cumulative count of the number of telephone calls received since the interface was last armed is updated (Block 1022), i.e., incremented. Next, or if the telephone call flag is reset, the manu flag is tested (Block 1024). If the menu flag is set and the menu function is enabled, the vocal menu program of FIG. 6B begins to execute at Block 1100. Execution of the main control program resumes at Block 1136. Next, or if the menu flag is reset, the testing of the flags repeats, or loops, by returning to Block 1004 described above. This process of testing the flags continues to repeat until power is removed from the interface unit or until an interrupt signal is received.

The interrupt signal is received, in the preferred embodiment, approximately every nine milliseconds. When the interrupt signal is received, the interrupt program of FIG. 6C is executed. When the interrupt program has finished executing, the main control program resumes execution at the main control program location where the interrupt signal occurred.

Referring next to FIG. 6B, a flow chart of the menu program is shown. Execution of the menu program begins at Block 1100 shown in both FIGS. 6A and 6B and continues with Block 1102. In Block 1102, a vocal menu begins, i.e., the interface unit begins to generate a vocal list of menu options and the menu pad becomes sensitive to operation by the operator. It is important to note that not all of the menu options are always available. When a menu option is unavailable, it is skipped and the next menu option is read.

As the vocal menu is read to the operator, the operator may respond by touching the menu pad, thereby selecting the menu option immediately preceding the operators selection. The vocal menu first presents the "ARM" option (Block 1104). If the operator selects the menu pad immediately following the "ARM" option (Block 1104), the interface unit will begin a passive arming sequence as described above. The interface unit will wait for the automobile's door to open or for 30 seconds to pass, after which it will wait for all doors, the trunk and the hood to be closed or for two minutes to pass, after which the interface will arm itself and will say "Armed" through the speaker. Note that the arm menu option is disabled when the interface unit is used in conjunction with a host alarm system and is only available when the interface unit is used as a stand-alone alarm system. When the interface unit is used in conjunction with a host alarm system, the host alarm system's arming means is used to arm/disarm the interface unit. After arming the interface unit, the menu program proceeds to Block 1136 shown in FIGS. 6A and 6B.

If the menu pad is not selected in Block 1104 or if Block 1104 is skipped because the interface unit is used in conjunction with a host alarm, the menu program proceeds to Block 1108 and the report menu option is read to the operator. If the operator selects the menu pad following the report option, the menu program proceeds to Block 1110 and a vocal violation report is generated. Note that during the violation report, the nine millisecond interrupt is disabled, i.e., the interrupt program is not executed. The report option generates a vocal report which includes messages, depending on which sensors have been installed and which sensors have been triggered, corresponding to sensors that have detected a violation of the automobile since the most recent arming of the interface unit. Upon arming the interface unit, the vocal report is reset and only violations subsequent to the arming of the interface unit are included in subsequent violation reports. The vocal violation report also includes the time elapsed since the detection of the violation by each sensor and the number of phone calls received by the cellular telephone while the system was armed. The menu program then proceeds to Block 1136 shown in FIG. 6A and 6B.

If the menu pad is not selected during the report option, the vocal menu next reads the phone call option (Block 1112) and if the menu pad is selected, proceeds to the phone call report (Block 1114). During the phone call report, the interface unit reports the number of phone calls received since the system was last armed. (The phone call report is reset upon each arming of the interface unit.) Note that the nine millisecond interrupt is disabled during the phone call report. The menu program then proceeds to Block 1136 shown in FIG. 6A and 6B.

If the phone call option is not selected, the menu program proceeds to the silent mode engage/disengage option (Block 1116). If the silent mode option is selected, the "Armed" and "Disarmed" speech messages (used in response to the "ARM" and "DISARM" signals respectively) are disabled, if previously enabled, or enabled, if previously disabled, i.e., the use of speech messages during arming and disarming is toggled on or off (Block 1118). The menu program then proceeds to Block 1136 shown in FIG. 6A and 6B. Note that the term engage is used to mean "turn on" and the term disengage is used to mean "turn off" throughout the specification. Thus, the speaker may be used to deliver the speech message "ON" or "OFF" in, e.g., Block 1118, to indicate the status of the speaker. Similarly, an "ON" or "OFF" speech message may be used in conjunction with each of the engage/disengage blocks, i.e., 1118, 1122, 1126, and 1134.

If the menu pad is not selected during the silent mode option, the telephone call input engage/disengage option is presented (Block 1120). If the menu pad is selected during the telephone input engage/disengage option, the telephone call input is engaged, if previously disengaged, or disengaged, if previously engaged (Block 1122). After engaging or disengaging the telephone call input, the menu program proceeds to Block 1136 shown in FIGS. 6A and 6B.

If the telephone input option is not selected, the menu program proceeds to the sensor engage/disengage option (Block 1124). Note that although only one sensor engaged/disengage option is shown in FIG. 6B, that a sensor engage/disengage option will be presented for each sensor that is connected to the interface unit. If the menu pad is selected as the vocal menus traverses a sensor engage/disengage option, the corresponding sensor will be engaged, if previously disengaged, or disengaged, if previously engaged. After engaging or, disengaging a sensor, the menu program proceeds to Block 1136 shown in FIGS. 6A and 6B.

If the menu pad is not selected as the sensor engage/disengage options are read to the operator, the menu program proceeds to the test option (Block 1128). If the menu pad is selected during the test option, the menu pad proceeds to the check sensor input routine (Block 1130). The check sensor input routine allows the operator to test any of the vehicles sensors that are connected to the interface unit. Note that when the system interface unit is initially installed, the sensor engaged/disengaged options (Block 1124) and the telephone input engage/disengage option (Block 1120) are not presented to the user in the vocal menu. After the sensor inputs and the telephone input are successfully tested in the check sensor inputs routine (Block 1130), the corresponding options are added to the vocal menu. During the test option, when a sensor detects a violation of the automobile, the interface unit will say "Sensor violation" via the speaker, or, e.g., "Door violation" or "Trunk violation" corresponding to a particular sensor. As soon as a sensor detects a violation of the automobile, the sensor's engage/disengage option is added to the vocal menu.

To enable the vocal menu for the telephone input engage/disengage option, the cellular telephone must receive an incoming telephone call while the check sensor inputs routine is executing. When an incoming telephone call is detected and the check sensor input routine is executing, the interface unit says "You have a telephone call," via the speaker and the telephone input engage/disengage option is added to the vocal menu.

Note that the interrupt program is not executed during the check sensor input routine.

After the operator has completed tests of sensor inputs and the telephone input as desired, the check sensor inputs routine can be terminated by the operator selecting the menu pad. After the menu pad has been selected, the menu program proceeds to Block 1136 shown in FIGS. 6A and 6B.

If the menu pad is not selected during the test option, the menu program proceeds to the alarm engage/disengage option (Block 1132). The alarm engage/disengage option is used to put the interface unit in stand alone mode, by engaging the alarm option, or in interface mode, i.e., for use with a host alarm system, when the alarm option is disengaged. If the menu pad is selected during the alarm engage/disengage option, the menu program proceeds to Block 1134 where, if the alarm option is engaged, it is disengaged, and if the alarm option is disengaged, it is engaged. After changing the status of the alarm option, the menu option proceeds to Block 1136 shown in FIGS. 6A and 6B.

If the alarm engaged/disengaged option is not selected, the menu program proceeds to Block 1136 shown in FIGS. 6A and 6B.

Referring next to FIG. 6C, a flow diagram of the interrupt program is shown. The interrupt program is executed approximately every nine milliseconds during execution of the main control program and during execution of the menu program, except as noted above. Every nine milliseconds the interrupt program begins (Block 1200). First the time is incremented (Block 1202), thereby recording a time value that can be used to determine the elapsed time after a sensed violation event. The elapsed time information is used during the violation report mentioned above. Next, the flashing lights routine is executed (Block 1204). This routine is used to turn the automobiles lights on and off as desired, e.g., on or off every second when the alarm flag is set. Next, the read inputs routine is executed (Block 1206). The read inputs routine is used to determine the presence of the "ARM"/"DISARM" signal, the trigger signal, the violation signal, the ring signal and the selection of the menu pad. Next, the interrupt program proceeds to Block 1208, wherein the set flags routine is executed. The set flags routine sets/resets the arm/disarm flags, trigger flag, alarm flag, telephone call flag, and/or the menu flag in response to the read inputs respectively. These flags are used by the main control program as described above. After the sets flags routine is executed, the interrupt program terminates (Block 1210) and the main control program resumes execution at the same point where the nine millisecond interrupt signal interrupted the main control or menu programs.

As described above, it is thus seen that the present invention provides an interface unit that may be coupled to an existing automobile or other alarm system in order to adapt such existing alarm system to include additional features not originally included in the existing alarm system, particularly voice or vocal reporting and alarm features.

As further seen from the above description, the interface unit of the present invention advantageously adapts the existing alarm system to include the desired additional features without requiring the removal or deinstallation of the existing alarm system. In one embodiment or configuration, the new features are added by connecting the interface unit in parallel to the existing alarm system. Such parallel configuration offers the advantage of allowing the interface unit to be used to enhance the existing alarm system without requiring any modification to the existing alarm system's wiring. In another embodiment or configuration, the new features are added by connecting the interface unit in series with the existing alarm system. Such series configuration offers the advantage of allowing each of the plurality of sensors used with the existing alarm system to be selectively enabled or disabled at a cost of requiring only minimal modification to the existing alarm system's wiring.

While the invention herein disclosed has been described by means of specific embodiments and applications thereof, numerous modifications and variations could be made thereto by those skilled in the art without departing from the scope of the invention set forth in the claims.

What is claimed is:

1. An alarm system for protecting a mobile personal property, the alarm system including:
   an existing alarm device including:
      a control unit,
      a sensor coupled to the control unit, the sensor generating a violation signal in response to a violation condition against the mobile personal property, the control unit generating an alarm signal in response to the violation signal and in response to an arm signal,
      an alarm siren coupled to the control unit, the alarm siren sounding an audible alarm in response to the alarm signal, and
      an arming circuit coupled to the control unit, the arming circuit generating the arm signal in response to the existing alarm device being armed, and generating a disarm signal in response to the existing alarm device being disarmed; and
   an interface unit including:
      a controller coupled to the sensor and receiving the violation signal therefrom, and coupled to the control unit and receiving the alarm signal therefrom,
      a cellular telephone interface coupled to the controller, the cellular telephone interface being responsive to a ring signal from a cellular telephone, the ring signal being passed by the cellular telephone interface to the controller,
      an arm input coupled to the controller and coupled to the arming circuit, the controller receiving the arm signal and the disarm signal via the arm input,
      a speech processor coupled to the controller and receiving the alarm signal and the ring signal therefrom,
      a memory device coupled to the speech processor, the memory device storing a plurality of stored speech data signals, the speech processor selecting a first of the plurality of stored speech data signals in response to the ring signal from the cellular telephone and selecting a second of the plurality of stored speech data signals in response to the alarm signal and the arm signal from the existing alarm device, and
      a speaker that generates a plurality of audible voice messages, the speaker generating a first of the plurality of audible voice messages in response to the speech processor selecting the first of the plurality of stored speech data signals, and generating a second of the plurality of audible voice messages in response to the speech processor selecting the second of the plurality of stored speech data signals.

2. The alarm system of claim 1 wherein:
   said sensor is coupled to said control unit via said controller; and
   said controller passing said violation signal to said control unit as a trigger signal that is generated by said controller in response to said violation signal only when said sensor is activated by said controller;
   whereby said control unit generates said alarm signal in response to said violation signal and said arm signal only when said sensor is activated by said controller.

3. The alarm system of claim 1 wherein:
   said sensor is electrically connected to said control unit; and
   said sensor is also electrically connected to said controller;
   whereby said control unit and said controller both receive said violation signal from said sensor.

4. The alarm system of claim 1 wherein:
   said controller counts the number of incoming calls received by said cellular telephone in response to said ring signal from said cellular telephone and said arm signal from said existing alarm device; and
   said speech processor selecting a third of said plurality of stored speech data signals in response to said number of incoming calls received and said disarm signal from said existing alarm device; and
   said speaker generating a third of said plurality of audible voice messages in response to said speech processor selecting the third of said plurality of stored speech data signals, the third of said plurality of audible voice messages indicating the number of incoming calls received by said cellular telephone;
   whereby the number of incoming calls received by said cellular telephone are counted by the controller at the mobile personal property when said existing alarm system is armed; and
   whereby the number of incoming calls received by said cellular telephone is reported by the speaker at the mobile personal property when said existing alarm system is disarmed.

5. An alarm system for protecting a mobile personal property, the alarm system including:
   an existing alarm device including:
      a control unit,
      a sensor coupled to the control unit, the sensor generating a violation signal in response to a violation condition against the mobile personal property, the control unit generating an alarm signal in response to the violation signal and in response to an arm signal,
      an alarm siren coupled to the control unit, the alarm siren sounding an audible alarm in response to the alarm signal, and
      an arming circuit coupled to the control unit, the arming circuit generating the arm signal in response to the existing alarm device being armed, and generating a disarm signal in response to the existing alarm device being disarmed; and
   an interface unit including:

a controller coupled to the sensor and receiving the violation signal therefrom, and coupled to the control unit and receiving the alarm signal therefrom, a cellular telephone interface coupled to the controller, the cellular telephone interface being responsive to a ring signal from a cellular telephone, the ring signal being passed by the cellular telephone interface to the controller, the controller counting the number of incoming cellular telephone calls in response to the ring signal from the cellular telephone;

an arm input coupled to the controller and coupled to the arming circuit, the controller receiving the arm signal and the disarm signal via the arm input, a speech processor coupled to the controller and receiving the alarm signal therefrom, a memory device that stores a plurality of stored speech data signals, the speech processor selecting a first of the plurality of stored speech data signals in response to the alarm signal and the arm signal from the existing alarm device, and a speaker that generates a plurality of audible voice messages, the speaker generating a first of the plurality of audible voice messages in response to the speech processor selecting the first of the plurality of stored speech data signals.

6. The alarm system of claim 5 wherein:

said controller counts the number of incoming calls received by said cellular telephone in response to said ring signal from said cellular telephone and said arm signal from said existing alarm device; and said speech processor selecting a second of said plurality of stored speech data signals in response to said number of incoming calls received and said disarm signal from said existing alarm device; and said speaker generates a second of said plurality of audible voice messages in response to said speech processor selecting the second of said plurality of stored speech data signals, the second of said plurality of audible voice messages indicating the number of incoming calls counted by said controller;

whereby the number of incoming calls received by said cellular telephone are counted by the controller at the mobile personal property when said existing alarm system is armed; and whereby the number of incoming calls counted is reported by the speaker at the mobile personal property when said existing alarm system is disarmed.

7. The alarm system of claim 6 wherein:

said speech processor generates a third of said plurality of stored speech data signals in response to said ring signal from said cellular telephone; and said speaker generates a third of said plurality of audible voice messages in response to said speech processor selecting the third of said plurality of stored speech data signals, the third of said plurality of audible voice messages announcing receipt of each of said incoming cellular telephone calls at said mobile personal property as each of said incoming cellular telephone calls is received by said cellular telephone.

8. The alarm system of claim 5 wherein:

said sensor is coupled to said control unit via said controller; and said controller passing said violation signal to said control unit as a trigger signal that is generated by said controller in response to said violation signal only when said sensor is activated by said controller;

whereby said control unit generates said alarm signal in response to said violation signal and said arm signal only when said sensor is activated by said controller.

9. The alarm system of claim 5 wherein:

said sensor is electrically connected to said control unit; and said sensor is also electrically connected to said controller;

whereby said control unit and said controller both receive said violation signal from said sensor.

* * * * *